United States Patent Office.

RASSELAS FARLEY, OF CINCINNATI, OHIO.

Letters Patent No. 111,444, dated January 31, 1871.

IMPROVEMENT IN TREATING COTTON-SEED OIL TO RENDER IT DRYING.

The Schedule referred to in these Letters Patent and making part of the same.

I, RASSELAS FARLEY, of Cincinnati, Hamilton county, Ohio, have invented a new and useful Process for Converting Cotton-seed Oil into a Drying Oil, of which the following is a specification.

Having agitated one hundred parts (100 parts) crude cotton-seed oil for two hours (2 hours) in an ordinary atmospheric churn, I let the same settle, so as to precipitate the fatty and feculent matters. I then draw off the clear liquor into another vessel and mix therewith fifteen parts (15 parts) spirits of turpentine and two parts (2 parts) powdered resin.

This mixture I pour into a suitable vessel, place it over a slow fire, and allow it to simmer for two hours. When cooled and settled, the clear liquid is drawn off and is ready for use without further manipulation.

Claim.

I claim as new and of my invention—

The process for converting crude cotton-seed oil into a drying oil, substantially as herein explained.

In testimony of which invention I hereunto set my hand.

his
Witnesses:   RASSELAS × FARLEY.
            mark.
 GEO. H. KNIGHT,
 JAMES H. LAYMAN.